(12) United States Patent
Hofmann et al.

(10) Patent No.: US 12,315,384 B2
(45) Date of Patent: May 27, 2025

(54) AUGMENTED-REALITY-SYSTEM FOR TEACHING A USER OF AN APPLICATION

(71) Applicant: SICK AG, Waldkirch (DE)

(72) Inventors: Christoph Hofmann, Waldkirch (DE); Jens Gebauer, Waldkirch (DE); Heiko Steinkemper, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 18/096,673

(22) Filed: Jan. 13, 2023

(65) Prior Publication Data

US 2023/0230500 A1   Jul. 20, 2023

(30) Foreign Application Priority Data

Jan. 14, 2022   (DE) .......................... 102022100840.1

(51) Int. Cl.
  *G09B 19/00*   (2006.01)
  *G06T 11/00*   (2006.01)
  *G09B 7/06*    (2006.01)

(52) U.S. Cl.
  CPC ............ *G09B 19/003* (2013.01); *G06T 11/00* (2013.01); *G09B 7/06* (2013.01)

(58) Field of Classification Search
  CPC .......... G09B 19/003; G09B 7/06; G06T 11/00
  See application file for complete search history.

(56) References Cited

U.S. PATENT DOCUMENTS 9,984,178 B2 * 5/2018 Kuwahara ............. B25J 9/1671
10,074,215 B2 * 9/2018 Meier ................... G06T 19/006
10,634,785 B2 * 4/2020 Hofmann ................ G01V 8/10
10,764,556 B2 * 9/2020 Katz ....................... G06T 7/593
10,860,010 B2 * 12/2020 Shimakawa ........... B25J 9/1671

(Continued)

FOREIGN PATENT DOCUMENTS

DE    102006050997 A1    4/2008
DE    102018212944 A1    2/2020

(Continued)

OTHER PUBLICATIONS

German Search Report for corresponding application 102022100840.1 issued Jan. 14, 2023.

(Continued)

*Primary Examiner* — Xuan M Thai
*Assistant Examiner* — Sadaruz Zaman
(74) *Attorney, Agent, or Firm* — Nath, Goldberg & Meyer; Jerald L. Meyer (57) ABSTRACT

The present invention relates to an augmented reality system (AR system) for teaching a user of an application. The AR system comprises a detection unit that detects a real environment and provides it as environmental data, wherein at least one work unit is arranged in the environment; a communication unit that receives process data from the work unit; a control unit that processes the process data and environmental data, wherein a virtual image can be created based on the process data; and a display unit that displays the real environment and the virtual image in relation to one another to a user. The AR system further comprises an audio output unit that, on the basis of the process data, outputs audio signals for instructing a user, wherein the audio signals are preferably matched to the virtual image.

15 Claims, 6 Drawing Sheets

(56) References Cited

U.S. PATENT DOCUMENTS

| | | | |
|---|---|---|---|
| 10,896,543 B2* | 1/2021 | Kuffner | G06F 1/163 |
| 10,987,176 B2* | 4/2021 | Poltaretskyi | G16H 40/63 |
| 11,090,804 B2* | 8/2021 | Sugaya | G06F 3/0482 |
| 11,174,989 B2* | 11/2021 | Böhning | F16P 3/144 |
| 11,270,510 B2* | 3/2022 | Warhol | H04N 13/366 |
| 11,465,283 B2* | 10/2022 | Prinz | B25J 9/1666 |
| 11,558,729 B2* | 1/2023 | Hammes | G01S 13/74 |
| 11,662,737 B2* | 5/2023 | Herlant | G05D 1/0227 |
| | | | 701/25 |
| 11,879,974 B2* | 1/2024 | Steinkemper | G01S 7/486 |
| 2007/0202472 A1* | 8/2007 | Moritz | H04N 7/18 |
| | | | 348/E13.045 |
| 2017/0219708 A1* | 8/2017 | Gebauer | G01S 17/89 |
| 2018/0286134 A1* | 10/2018 | Warhol | G06F 3/011 |
| 2020/0290205 A1* | 9/2020 | Hammes | B25J 9/1674 |
| 2021/0094180 A1* | 4/2021 | Szafir | G06F 3/011 |
| 2021/0142526 A1* | 5/2021 | Mantyjarvi | G06T 11/00 |
| 2021/0154844 A1* | 5/2021 | Ooba | B25J 19/023 |
| 2022/0244995 A1* | 8/2022 | Hofmann | F16P 3/142 |

FOREIGN PATENT DOCUMENTS

| | | |
|---|---|---|
| EP | 3546136 A1 | 10/2019 |
| EP | 3546136 B1 | 1/2021 |
| WO | 2020005989 A1 | 1/2020 |

OTHER PUBLICATIONS

German Search Report for corresponding application 10 2022 100 840.1 issued Feb. 15, 2024.

Hegenberg et al., "Augmented-Reality-basierte Assistenz für das Anlernen manueller und roboterunterstützter Montageprozesse", Z.Arb.Wiss. (2021) 75:367-387, Oct. 14, 2021, https://doi.org/10.1007/s41449-021-00278-3 (English abstract included).

* cited by examiner

| Employee No. | First name | Last name | Instruction level for application 1 | Validity period of the instruction for application 1 | Instruction level for application 2 | Validity period of the instruction for application 2 |
| --- | --- | --- | --- | --- | --- | --- |
| 1 | Max | Mustermann | Passed | 265 days | Failed | - |
| 2 | Andreas | Schuster | Failed | - | Passed | 150 days |
| ... | ... | ... | ... | ... | ... | ... |

AUGMENTED-REALITY-SYSTEM FOR TEACHING A USER OF AN APPLICATION

FIELD

The invention relates to an augmented reality system for teaching a user of an application and to a corresponding method as well as to a digital end device for such an augmented reality system.

BACKGROUND

Today, applications and in particular industrial applications increasingly require the interaction between human and machine. In particular, the cooperation between humans and, for example, industrial robots is increasingly becoming spatially closer and more interactive.

Such human-machine interactions harbor an increased potential for danger. Thus, during such interactions, accidents can, for example, occur that can lead to injuries of humans. Furthermore, productivity deficits arise when the interaction between human and machine is not optimally coordinated with one another. Consequently, there is a need to further increase the safety of the interaction between human and machine as well as the productivity.

It is an underlying object of the invention to provide a system and a method of instructing a user of an application and a corresponding digital end device for instructing a user of an application that increase the safety and/or productivity in human-machine interactions.

SUMMARY

This object is satisfied by the subjects of the independent claims. Further advantageous embodiments can be seen from the dependent claims.

The invention relates to an augmented reality system (AR system) for teaching a user of an application, comprising: a detection unit that detects a real environment and provides it as environmental data, wherein at least one work unit is arranged in the environment;
a communication unit that receives process data from the work unit;
a control unit that processes the process data and environmental data, wherein a virtual image can be created based on the process data;
a display unit that displays the real environment and the virtual image in relation to one another to a user; and
an audio output unit that, on the basis of the process data, outputs audio signals for instructing a user, wherein the audio signals are preferably matched to the virtual image, in particular contextually and/or causally.

In other words, a real environment detected by the detection unit is superposed by an image that is created by means of process data of the work unit and that is displayed on a display unit. The detection unit can, for example, be a camera that records image and/or video data and/or 3D or depth data of the real environment as environmental data. These image and/or video data are displayed as image and/or video recordings on the display unit after the transmission to the communication unit and the processing by the control unit. To improve an instruction of a user, the image and/or video recordings of the real environment are displayed with a virtual image, which can comprise a plurality of virtual objects, in relation to one another on the display unit, i.e. the AR system processes the environmental data of the real environment and the process data of the work unit to adapt the virtual image to the real environment. The virtual image is in particular integrated into the real environment such that it appears that the virtual image is actually located in the real environment. The audio output unit further outputs, based on the process data of the work unit, audio signals for instructing a user. The audio signals are preferably matched to the virtual image, in particular contextually and/or causally, i.e. the audio signals support the content communicated by the virtual image.

An instruction can generally comprise one or a plurality of the following components: teaching a user, training a user, lecturing a user, assisting a user, instructing a user, specifying information with respect to a use of the work unit, specifying hazard warnings and/or warnings, and specifying general information. In this respect, the instruction can take place in the form of spoken text, in particular comprising a plurality of complete spoken sentences, audio signals, i.e. individual sounds, and/or the like. For example, an instruction manual for operating the work unit can be provided as an audio output to the user.

The environmental data can also comprise data that are provided separately from the data of the detection unit, for example CAD data, e.g. in the form of a virtual surface model of the work unit and/or of the environment. In this way, it can then be determined by means of the environmental data that the work unit is approaching a wall or another object in the environment. For example, crushing hazards can thereby be automatically recognized by the AR system if e.g. a tool or another part of the work unit falls below a predetermined distance from an object in the environment. In this way, it can be made possible to e.g. consider (automatic) subsequent changes in the movements of the work unit. Thus, it can in particular be taken into account in the instruction that the work unit can be enabled to make decisions independently and, for example, executes modified movements.

The audio signals can in this respect play a special role in increasing the safety. Thus, the user can perceive the audio signals at any time, even if he has e.g. directed his gaze on the work unit and cannot grasp graphical information at this moment, and can thus receive information that increases his safety.

The audio signals can in particular comprise warnings, behavioral rules and behavioral instructions, operating aids or operating instructions, and/or other audio signals useful for the instruction. The virtual image can, for example, comprise a virtual image of the work unit or a virtual image of the movement of the work unit, geometric shapes such as circles, rectangles, triangles and/or other geometric shapes, color markings or highlighted portions, and/or other images useful for an instruction, for example, also text-based representations e.g. of process parameters.

Further embodiments of the invention can be seen from the description, from the dependent claims, and from the drawings.

In accordance with a first embodiment, the process data comprise data for identifying a process step of the work unit and the audio output unit outputs an audio signal corresponding to an identified process step and/or the display unit displays a virtual image corresponding to an identified process step. The audio signal and the virtual image are in particular matched to one another, i.e. the content of the virtual image is supported by the audio signal. For example, a process step of the application can be represented by the virtual image via the display unit while the audio output unit simultaneously outputs relevant notes, information, and/or a description of the process step via the audio signal. The user thus experiences an instruction via different sensory perceptions, whereby the quality of the instruction and the absorption of the information by the user can be improved and misinterpretations of the visual information can be minimized.

In accordance with a further embodiment, the digital end device comprises a memory in which a plurality of audio signal data and/or augmentation data are stored, wherein the audio signal data and augmentation data can be associated with the process steps and/or phases of a working life cycle (e.g. putting into operation or maintenance).

The audio signal data and/or augmentation data are in particular categorized, i.e. audio signal data and/or augmentation data that are associated with a certain process step and/or a certain phase of a working life cycle are grouped in the memory. The audio signal data and/or augmentation data can in particular be stored as audio signal files and/or augmentation files. A categorization or grouping of the audio signal data and/or augmentation data by process step and/or working life cycle in this respect helps to consider different risks in the interaction between the user and the application. The audio signal data and/or augmentation data can also be supplied as audio signal files and/or augmentation files during a delivery of an application or can be downloadable via a QR code that is also supplied or via a serial number on a sensor. Alternatively, the audio signal data and/or augmentation data can also be stored on a cloud. In this case, the digital end device accesses the corresponding audio signal data and/or augmentation data via the cloud. Thus, the content can be easily updated. Different languages could be enabled on demand for certain users.

In accordance with a further embodiment, the audio output unit is configured to play back the audio data and/or the display unit is configured to play back the augmentation data before a process step that will occur in the future and/or at the start of a process step.

By playing back the audio data and/or augmentation data, reference is in particular made to the start of a new process step, to changed conditions, or to a changed state and/or to a transition from one process step into the next process step. The user is thus alerted to a change in the current state both by means of the audio signal and by means of the image on the display unit. In this respect, it is sufficient that the user perceives one of the signals so that the safety of the user is further increased.

The AR system can in particular be implemented as a publisher-subscriber system. For example, at the start of a process step or on a run-through of a process step, the work unit can publish the process step (publishing), wherein the digital end device subscribes to a corresponding status change (subscribing) and plays back corresponding audio data and/or augmentation data. The audio signal and the virtual image can hereby be optimally matched to an operation of the work unit.

In accordance with a further embodiment, the phases of a working life cycle comprise a putting into operation, a normal operation, a maintenance, a conversion and/or a dismantling of the application. The phase of the working life cycle can in particular be determined based on the process data. Furthermore, an application can also comprise further phases of a working life cycle than those mentioned here.

In accordance with a further embodiment, the AR system and the work unit are configured to communicate bidirectionally, wherein the AR system is configured to control and/or to influence the work unit.

In other words, data are transmitted from the AR system to the work unit and vice versa. In contrast to a unidirectional communication in which, for example, only the work unit transmits data to the AR system, due to the bidirectional communication, entries in the AR system can lead to a reaction or an action in the work unit, i.e. the operation of the work unit can be actively influenced via the AR system. For example, the execution of a process step can be selected and/or repeated and/or reset in time by means of the digital end device. Thus, a "stopping", "fast-forwarding", and/or "rewinding" of the executions of the process step is/are possible, i.e. the user can, for example, freely select an execution time via a time axis that corresponds to an execution time period of the process step. Additionally or alternatively, N repetitions of the same process step can take place and the AR system can automatically continue with the execution of a next process step after the execution of N repetitions.

In accordance with a further embodiment, the display unit is configured to display text messages. The text messages can in particular be matched to or generated from the audio signals and the virtual image by "audio-to-text converters" that, for example, work in an automated manner. In addition to such a transcription, a translation is also possible, i.e. that the audio data are presented in another language as text, similarly to a subtitle. The text messages can further be stored as text data in the memory and can be associated with corresponding audio data and augmentation data. The text messages can assist the user with an instruction in addition to the audio signal and the virtual image. The text messages can be displayed on the display unit and can display a subtitle, action and/or behavioral instructions or guidelines, a designation of a process step, warnings, and/or other information relevant for a process step. Audio data and/or text data can further be available and output in different languages.

In accordance with a further embodiment, the AR system is configured to check an instruction level of the user by means of a test, in particular a multiple choice test, and to enter and/or to update the instruction level of the user in a user database based on a test result.

For example, the test can take place automatically after a completion of an instruction. The test result can, for example, be determined based on a number of correctly answered questions, a number of incorrectly answered questions, and/or a ratio between correctly answered questions and incorrectly answered questions. The determined test result can be associated with an instruction level so that the instruction level is determined based on the test result. The instruction level of the user can preferably comprise two or more statuses. For example, the instruction level of the user can be "Passed" from a fixed number of correctly answered questions and "Failed" if the specific number of correctly answered questions is not reached. The instruction level can also comprise a qualification level. For example, the qualification level of the user can include the status "Beginner", "Experienced User" and "Expert", wherein, for example in a question set of ten questions, the correct answering of zero to four questions can result in the "Beginner" status, the correct answering of five to seven questions can result in the "Experienced User" status, and the correct answering of eight to ten questions can result in the "Expert" status.

It is also possible that the instruction level and the qualification level are separate metrics. For example, the instruction level can—as described above—indicate whether the user has successfully completed an instruction, whereas the qualification level is, for example, predefined independently of the instruction level.

Furthermore, answers to test questions can be entered via a touch display. For example, the display unit can be configured as a touch display in such a case. Additionally or alternatively, answers of the user to test questions can be entered into the AR system via a microphone and the spoken language or the spoken answers can be recognized by means of language recognition software.

The display unit can e.g. comprise a screen on which the environmental data (for example, an image or a video recorded by the detection unit) and, superposed thereon, the virtual image are displayed. The display unit can also comprise AR glasses. In the case of AR glasses as a display unit, the real environment can be displayed to the user by an at least partly light-permeable part of the AR glasses, wherein the virtual image is projected in a visible manner for the user.

On a successful completion of the test, a certificate can be issued that is stored in the user database, wherein a validity of the certificate can expire after a fixed period of time, for example, six months. The expiration date or a validity period can be stored in the user database. After the expiration of the validity of the certificate, the user can be prompted to refresh an instruction level by the AR system or the digital end device.

Data with respect to a user, in particular data that reproduce information on a qualification level of a user with respect to an instruction, are stored in the user database. Further data of the user database, for example, comprise an employee number, a first name, a last name, a job title, an instruction level with respect to an application, an instruction certificate, a date of a last instruction, and/or an expiration date of the certificate corresponding to an instruction, and/or a validity period of the certificate corresponding to an instruction, a qualification level, biometric data of a user, and/or other data.

In accordance with a further embodiment, the AR system comprises an instruction level determination unit that is configured to determine an identity of the user based on personal identification data and to determine the instruction level of the user based on the determined identity by means of the user database.

For example, the personal identification data can be acquired via a device number of the digital end device, via a login of a person in a system of a database by means of a password, via biometric data of a person, for example, by fingerprint recognition and/or face recognition. For example, the fingerprint and/or the face of the user can be acquired by means of a fingerprint sensor and/or a camera and can be compared with a fingerprint and/or a face of at least one user stored in the user database in order to determine the identity of the user.

In accordance with a further embodiment, the work unit is configured to set an operating mode of the work unit based on the instruction level of the user.

For this purpose, the work unit can receive data with respect to the instruction level of the user and can design or adapt safety parameters on the basis of the data received. For example, after a successful identification of the user and after a successful determination of the instruction level of the user, the AR system can transmit the data with respect to the instruction level of the user to the work unit that, for example, adapts the speed at which the work unit moves to the instruction level of the user. For a user who, for example, has stored a valid instruction certificate in the user database, the work unit can be operated in normal mode, i.e. without a reduction in the speed, whereas the work unit is operated at a reduced speed or stops the working operation for a user for whom no valid instruction certificate is stored in the user database. An increased safety and productivity can thus be ensured by a corresponding adaptation of the operating mode of the work unit to the instruction level of the user.

In accordance with a further embodiment, the AR system is configured to restrict or to extend a range of use and/or contents of the AR system based on the instruction level of the user.

For example, rights of use and access to contents of the AR system can be set based on the instruction level and/or the qualification level of the user. For example, the user can, based on his individual instruction level and/or qualification level, have rights of use for using predetermined functions of the AR system that are associated with the instruction level of the user. The functions of the AR system can, for example, comprise performing different instructions, controlling the robot, and/or calling up different contents of the AR system. For this purpose, users can, for example, be divided into the "Expert", "Experienced User", and "Beginner" qualification levels. A user of the "Expert" qualification level can use the full functionality of the AR system and can e.g. also access contents with respect to the putting into operation and maintenance of the work unit. A user of the "Experienced User" qualification level can, for example, likewise use all the functions of the AR system and has access to information about changes in the application but no access to contents with respect to the putting into operation and maintenance of the work unit. A user of the "Beginner" qualification level, in contrast, can, for example, only use certain predefined functions of the AR system, likewise receives information about changes in the application and, for example, has access to further training offers in the form of instructions in order to increase the qualification level and to advance to "Experienced User". In other words, an accessibility to functionalities of the AR system is set based on the qualification level and/or the instruction level of the user, i.e. the range of use of the AR system is adapted to the experience or the knowledge of the user and increased safety when using an application is thus provided.

In accordance with a further embodiment, the real environment and/or the work unit comprises/comprise a marking that is used by the AR system as a reference point and/or for recognizing the work unit.

The marking is in particular used as a reference point for augmented objects and in particular for the positioning of the augmented objects in a three-dimensional space. An improved and realistic representation of the augmented objects on the display unit can hereby be achieved. Additionally or alternatively, the AR system can determine a work unit type by means of the marking. For example, the work unit can comprise a robot and the marking can be used to determine a robot type, a robot model, and/or other properties of the robot. The marking can, for example, comprise a QR code that is detected by the detection unit of the AR system and uniquely identifies the type and kind of the work unit. A simple identification of the work unit is hereby possible.

In accordance with a further embodiment, the detection unit is spatially separated from the display unit and the communication unit, i.e. the detection unit is not located in close proximity to the display unit and the communication unit, and transmits the environmental data to the communication unit by means of telecommunication.

For example, the detection unit can be in direct spatial proximity to the work unit while the display unit and the communication unit are not in direct spatial proximity to the work unit. The detection unit and the display unit or the communication unit can in particular be located in different rooms or buildings. For example, the detection unit can communicate with the display unit and the communication unit by means of a LAN connection, a VPN connection, and/or a mobile radio connection to exchange data. Thus, a teleinstruction of the user is possible, i.e. a user who is not in the direct vicinity of the work unit can receive an instruction remotely.

In accordance with a further embodiment, a monitoring unit is configured to monitor a monitored zone and to transmit safety data to the communication unit, wherein the safety data are processed by the control unit, and the audio output unit is configured to output an audio signal when the processing of the safety data reveals that the user is entering the monitored zone of the monitoring unit.

For example, the audio signal comprises a warning signal that alerts the user that he has entered a safety-critical zone, i.e. the monitored zone. In particular, the work unit can additionally change the operating mode, i.e., for example, reduce or increase the speed, or stop the working operation, i.e. stop when the user enters the monitored zone. Additionally or alternatively, the audio output unit can be configured to output the audio signal without an occurrence of a causal event that was e.g. triggered by the user and/or the work unit. For example, the audio signal can comprise an auditory instruction manual, i.e. the audio signal comprises an audio track that is played independently of external events.

It is also conceivable that the AR system is not used exclusively to instruct a user, but is rather, for example, used for communicating causal steps that are to be carried out by the user of the application. For example, instructions can be communicated to the user via the audio output unit. In such a case, the audio signal comprises instructions such as "Task completed, please remove material", "Replenishment required", etc. Thus, the AR system can additionally be used as an operating aid.

The invention further relates to a method of teaching a user of an application by means of an augmented reality system, said method comprising that:
a real environment is detected and is provided as environmental data,
wherein at least one work unit is arranged in the environment;
process data are received from the work unit;
the process data and environmental data are processed, wherein a virtual image is created based on the process data;
the real environment and the virtual image are displayed in relation to one another to a user; and
audio signals for instructing a user are output on the basis of the process data, wherein the audio signals are preferably matched to the virtual image.

The invention furthermore relates to a digital end device for an augmented reality system for teaching a user of an application, said digital end device comprising:
a communication unit that receives process data from at least one work unit and environmental data from at least one detection unit that detects a real environment, wherein the work unit is arranged in the environment;
a control unit that processes the process data and environmental data, wherein a virtual image can be created based on the process data;
a display unit that displays the real environment and the virtual image in relation to one another to a user; and
an audio output unit that, on the basis of the process data, outputs audio signals for instructing a user,
wherein the audio signals are preferably matched to the virtual image.

The statements regarding the AR system apply accordingly to the method and the digital end device; this in particular applies with respect to advantages and embodiments. It is understood that all the features and embodiments mentioned herein can be combined with one another, unless explicitly stated otherwise.

BRIEF DESCRIPTION OF THE DRAWINGS

The invention will be presented purely by way of example with reference to the drawings in the following. There are shown.

DETAILED DESCRIPTION

Figure 1:
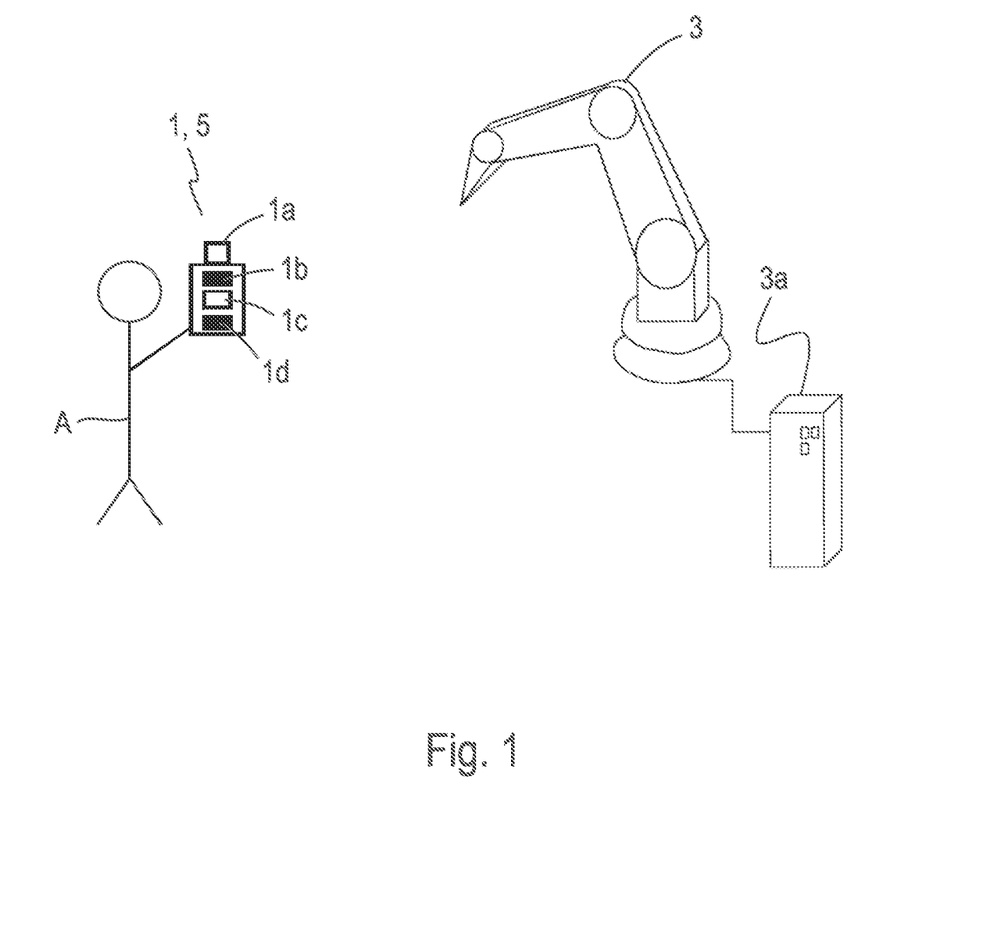
FIG. 1 a schematic representation of a real environment in which an augmented reality system is used.

FIG. 1 shows a schematic representation of a real environment in which an augmented reality system (AR system) 1 is used. In FIG. 1, the user A is in the vicinity of a work unit 3 that is represented as an industrial robot and that is connected to a controller 3a. The controller 3a controls the work unit 3 in its sequences by means of the process data stored in the controller 3a. The process data can comprise the controlled sequences of the work unit 3 and information on a process step and/or on the working life cycle of the work unit 3. The process data in particular comprise movement data of the work unit 3. CAD data of the work unit 3 can also be provided in the process data and/or augmentation data so that, for example, a true-to-scale image of the work unit 3 can be represented. In this respect, the work unit 3 can also comprise an automated guided vehicle system or a different type of processing machine. In this connection, movement data are, for example, understood as control data for controlling the robot or for driving the automated guided vehicle system from one location to another.

The AR system 1 in accordance with the invention used by the user A comprises a detection unit 1a that detects the real environment with the work unit 3. The detection unit 1a provides the acquired information as environmental data. The detection unit 1a preferably comprises a camera acquiring a depth of space and/or a wide-angle camera so that the real environment is detected over a large area and in detail. Furthermore, three-dimensional spatial data of the environment can be acquired by means of the detection unit 1a. In this connection, environmental data are therefore understood as data of the camera that are available as image data or can be converted into image data.

The AR system further comprises a communication unit 1b that receives the process data from the work unit 3, in particular from the controller 3a of the work unit 2. The AR system 1 furthermore comprises a control unit, not shown in FIG. 1, that processes the environmental data and the process data.

Here, the control unit creates a virtual image, which is displayed on a display unit 1c of the AR system 1, based on the environmental data and the process data. The display unit 1c displays the real environment and the virtual image in relation to one another. The image recordings recorded by the detection unit 1a can in particular be superposed with the virtual image so that the impression is created that the virtual image is one or more objects that are located in the real environment. The virtual objects of the virtual image can in this respect be two-dimensional and/or three-dimensional objects.

Furthermore, the process data of the work unit 3 can comprise data about programmed and/or possible movements, in particular movement sequences, of the work unit 3. The process data can also comprise data about a process step and/or a working life cycle of the work unit 3, for example, the process data can provide information about which process step is performed in a phase of a working life cycle.

The control unit can, for example, process the process data of the work unit 3 in real time and can thus adapt the virtual image to an operation of the work unit 3 in real time. The virtual image can, for example, represent a visualized movement sequence of the work unit 3, information, and/or any desired two-dimensional and/or three-dimensional image. The virtual image can comprise a plurality of different virtual objects. For example, a first virtual object of the virtual image can represent a virtual representation of the work unit 3, while a second virtual object of the virtual image can represent a pointer, for example, an arrow, an exclamation point, a text field or a text bubble, and/or a geometric shape such as a circle. The display duration of different virtual objects is preferably coordinated with one another.

In addition, audio signals are played via an audio output unit 1d, for example a speaker, and are provided to the user A.

The AR system 1 in FIG. 1 comprises a smartphone, wherein the individual units of the AR system 1 are integrated together in the smartphone. For example, the detection unit 1a comprises a smartphone front camera and/or a smartphone rear camera, the communication unit 1b comprises a transmitter and/or a receiver, the control unit comprises a CPU, the display unit 1c comprises a display, and the audio output unit 1d comprises a speaker. However, the AR system 1 can also comprise AR glasses, a helmet display, an electronic communication device, and/or a touchpad.

Figure 4:
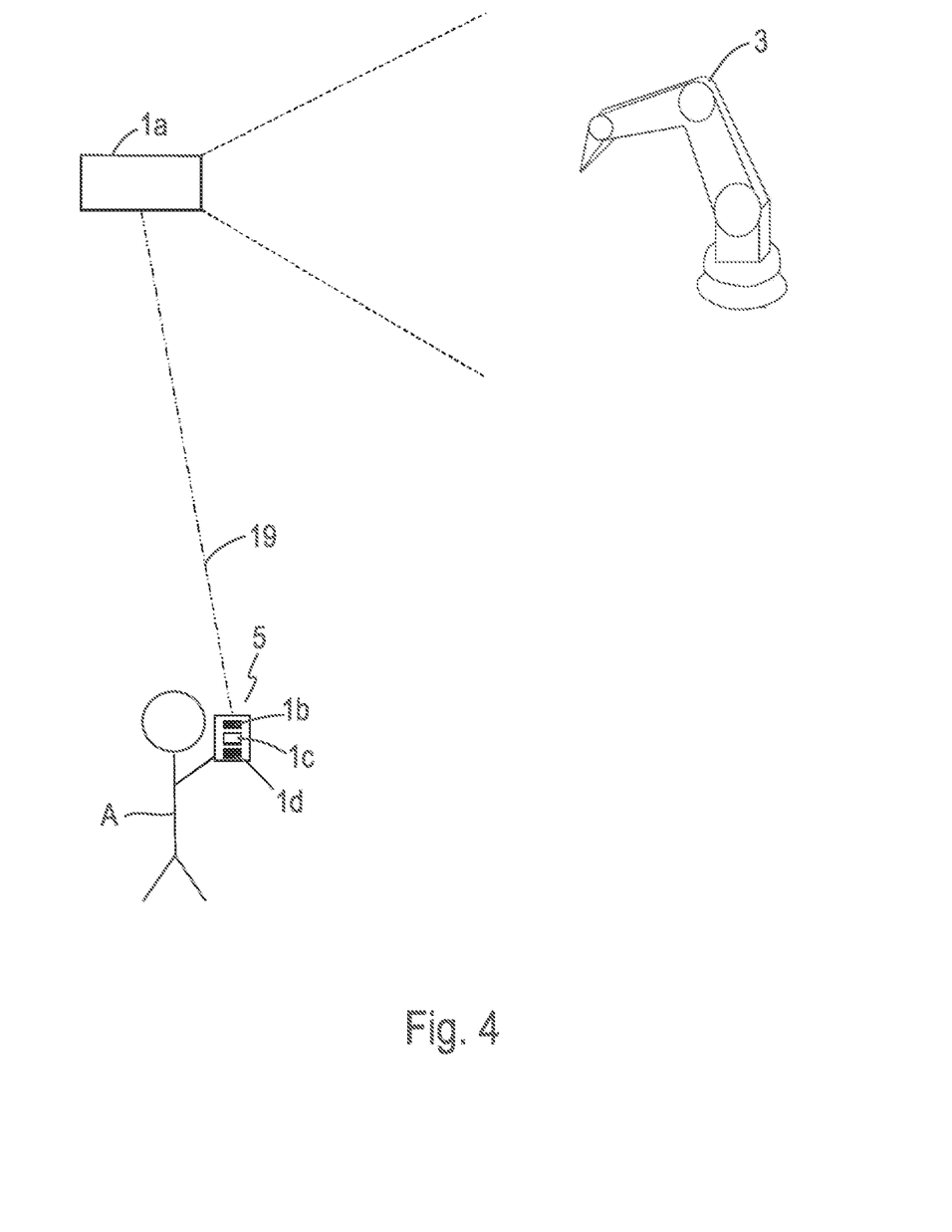
FIG. 4 an embodiment of the AR system in which an instruction takes place by means of telecommunication.

The AR system 1 in FIG. 1 simultaneously comprises a digital end device 5. However, it is to be understood that the digital end device 5 can also comprise fewer or more components than those described here. For example, the detection unit 1a in FIG. 4 is part of the AR system 1, but is not a part of the digital end device 5.

When the user A starts an instruction, the real environment in which the work unit 3 is located is detected via the detection unit 1a and is represented on the display unit 1c on the digital end device 5. If the work unit 3 represented on the display unit 1c runs through the individual process steps or process sequences of the work unit 3, a virtual image is generated and displayed on the display unit 1c based on the process data transmitted by the work unit 3, said virtual image being intended to help or support the user A when running through the instruction. In addition, audio signals that are likewise intended to assist the user A when carrying out the instruction are output via the audio output unit 1d.

The virtual image can, for example, comprise a virtual image of the work unit 3 or a virtual image of the movement of the work unit 3, geometric shapes such as circles, rectangles, triangles and/or other geometric shapes, color markings or highlighted portions, and/or other images useful for an instruction. The audio signals output by the audio output unit 1c can further comprise warnings, behavioral rules and behavioral instructions, operating aids or operating instructions, and/or other audio signals useful for the instruction. The audio signal can comprise a female and/or a male voice. In addition, instruction videos in sign language can be output in a window on the display unit and reproduce a corresponding content of the audio signal.

Figure 3:
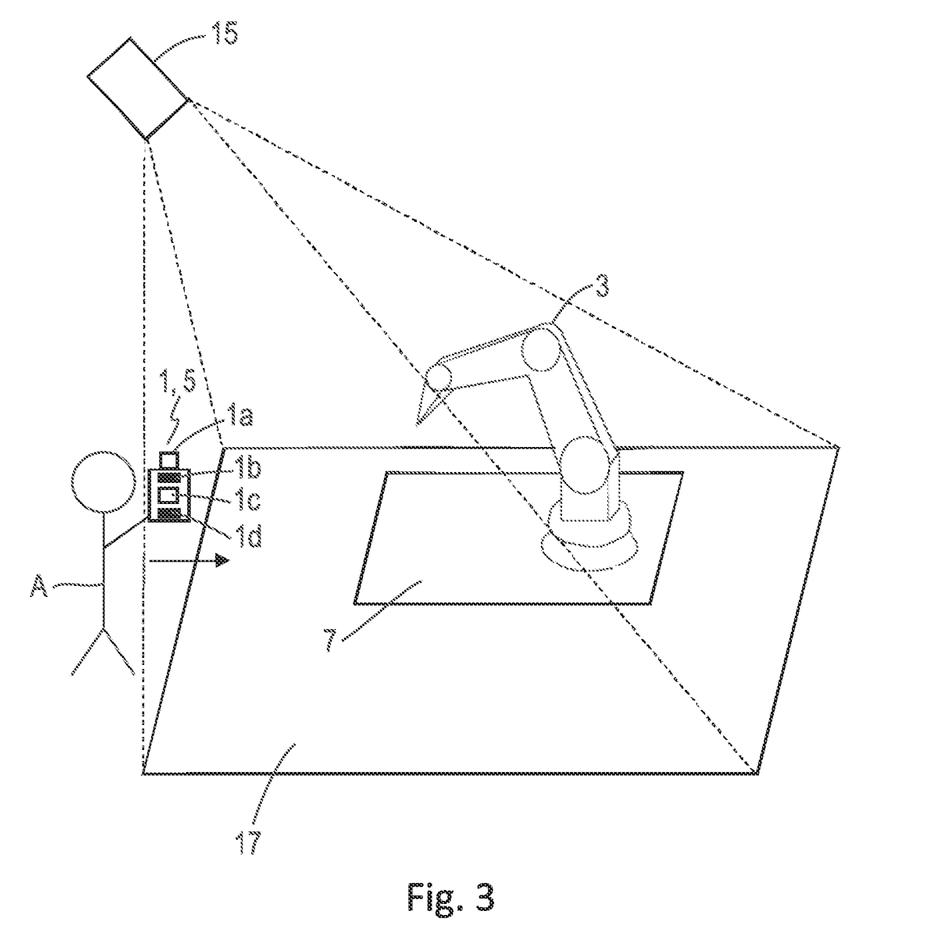
FIG. 3 a schematic representation of a real environment in which the AR system and a monitoring unit are used.

The displayed virtual image and the output audio signal can take place in a situation-based manner, i.e. reacting to the change in a state, and/or in a situation-independent manner, i.e. independently of a change in a state. An exemplary embodiment of a situation-based AR system is shown in FIG. 3.

It is also possible that a large number of users are simultaneously instructed via different digital end devices of an AR system. During such an instruction of a plurality of users, each user can, for example, individually perform an instruction via a digital end device, i.e. the virtual image displayed on an end device can, for example, differ from a virtual image displayed on another end device. Thus, the procedure of the instruction and the content of the instruction can be adapted to a respective user.

Figure 2:
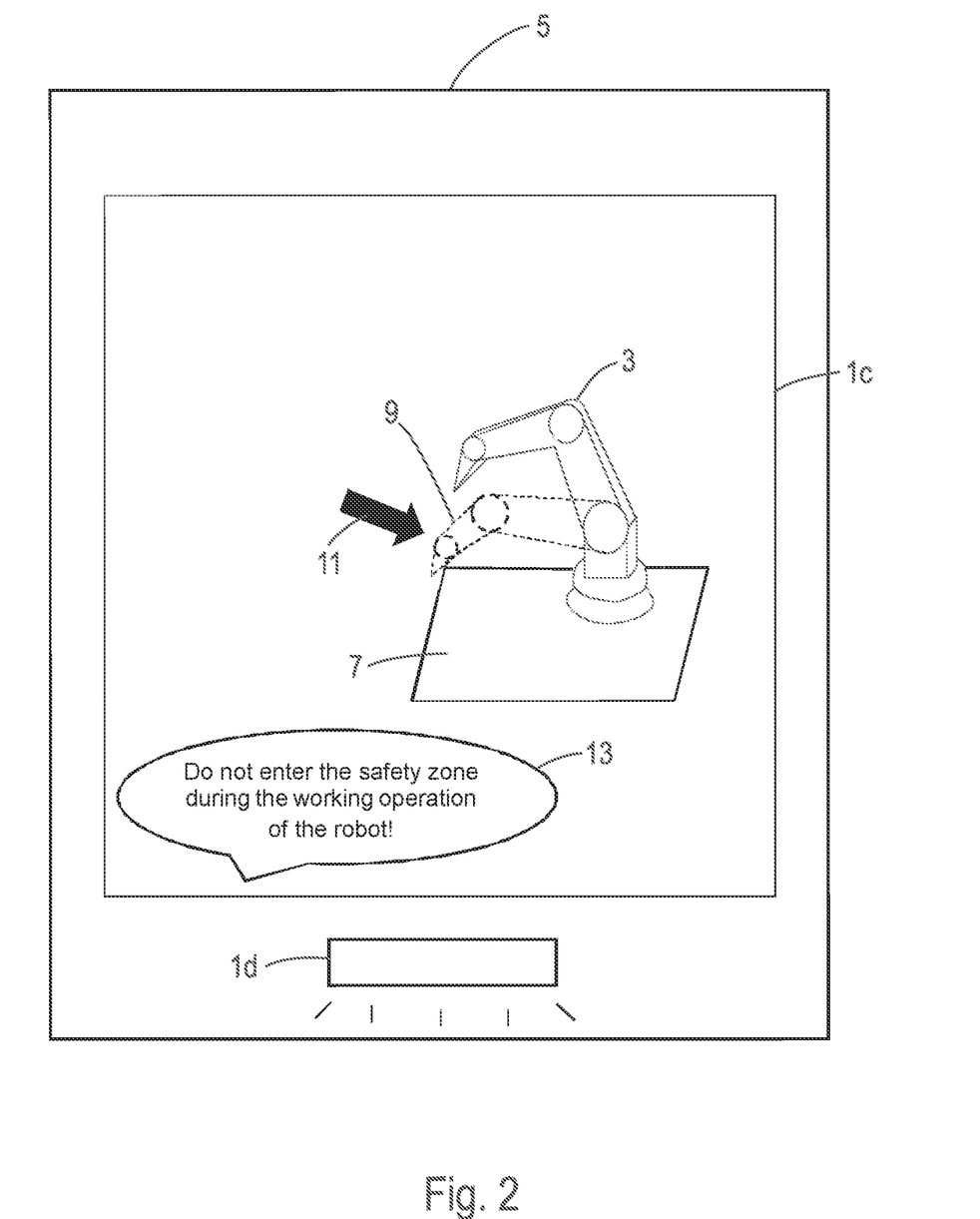
FIG. 2 a schematic detailed representation of a digital end device of the augmented reality system.

FIG. 2 is a schematic representation of the digital end device 5 that comprises the display unit 1c, the audio output unit 1d and the communication unit 1b and control unit that are not shown. On the display unit 1c, the real environment is represented based on the environmental data of the detection unit 1a. The work unit 3 (industrial robot), which is located in a safety zone 7, is located in the real environment detected by the detection unit 1a. The safety zone 7, for example, defines a zone in which the work unit 3 acts, i.e. a collision between a user A and the work unit 3 is not possible outside the safety zone 7. If a user A is runs through an instruction by means of the AR system 1, the movements and in particular the radius of movement of the work unit 3 are demonstrated to the user A on the display unit 1c by means of a virtual representation 9 of the work unit 3. In addition to the virtual representation 9 of the work unit 3, the safety zone 7 is highlighted in color by means of a further virtual image in that the safety zone is, for example, marked with a conspicuous color. In addition, a virtual object in the form of a virtual arrow 11 indicates to the user A, during the run-through of the instruction, on which zone the user A has to direct his attention. Furthermore, a text, and in particular a note, is communicated to the user A by a text field 15. The text included in the text field 15 can be reproduced via the audio output unit 1d. Alternatively, a text deviating from the text displayed in the text field 15 can be reproduced as an audio signal.

It is to be understood that the recording of the display unit 1c shown in FIG. 2 is only a snapshot during the run-through of the instruction and that the individual virtual objects can change during the run-through of the instruction. Furthermore, on the run-through of an instruction, virtual images can also be displayed without the assistance by the audio signal and vice versa.

FIG. 3 shows an embodiment of the AR system 1 corresponding to FIG. 1, wherein a monitoring unit 15 that monitors a monitored zone 17 is additionally arranged in the real environment. The work unit 3 and the safety zone 7 of the work unit 3 are located in the monitored zone 17. The monitoring unit 15 transmits safety data to the communication unit 1b of the AR system 1 that are processed by the control unit, not shown, of the AR system 1. Based on the safety data of the monitoring unit 15, the control unit determines whether a user A is entering the monitored zone 17 and/or is located in the monitored zone 17. If the determination reveals that a user A is entering the monitored zone 17, the audio output unit 1*d* of the AR system 1 outputs a first audio signal to alert the user A that he has entered the monitored zone 17. Additionally or alternatively, the work unit 3 can reduce its speed to reduce the damage in the event of a potential collision with the user A. Furthermore, a second audio signal deviating from the first audio signal is output when the processing of the safety data by the control unit reveals that the user A is entering the safety zone 7 that is likewise detected by the monitoring unit 19. Additionally or alternatively, the work unit 3 can end and stop the working operation in such a case.

FIG. 4 shows an embodiment of the AR system 1 in which the detection unit 1*a* is located in the direct vicinity of the work unit 3, while the user A and the digital end device 5, which comprises the communication unit 1*b*, the display unit 1*c* and the audio output unit 1*d*, are not located in the direct vicinity of the work unit 3. In such a case, the detection unit 1*a* and the digital end device 5 or the communication unit 1*b* communicate with one another via a remote connection 19, i.e., for example, a LAN connection, a VPN connection and/or a mobile radio connection, so that the user A does not have to be physically on site or in the direct vicinity of the work unit 3 to participate in an instruction. Consequently, by means of such an embodiment of the invention, a teleinstruction is possible over any desired distances between the user A or the digital end device 5 and the work unit 3 or the detection unit 1*a*. For example, an employee of a company can receive an instruction from his private home by means of a digital end device 5 in that a camera on the company's premises transmits image and/or video data, which show the work unit 3 located on the company's premises, to the digital end device 5 on which the user A receives the instruction. In such a case, even an interactive group instruction—similar to a webinar—would be possible.

The above-mentioned bidirectional interface with which certain sections can be repeated could then only be "performed by a master"—for example, the leader of the instruction. The master capacity can also be passed on to other participants. However, this can only be permitted for one user per time interval.

Figure 5:
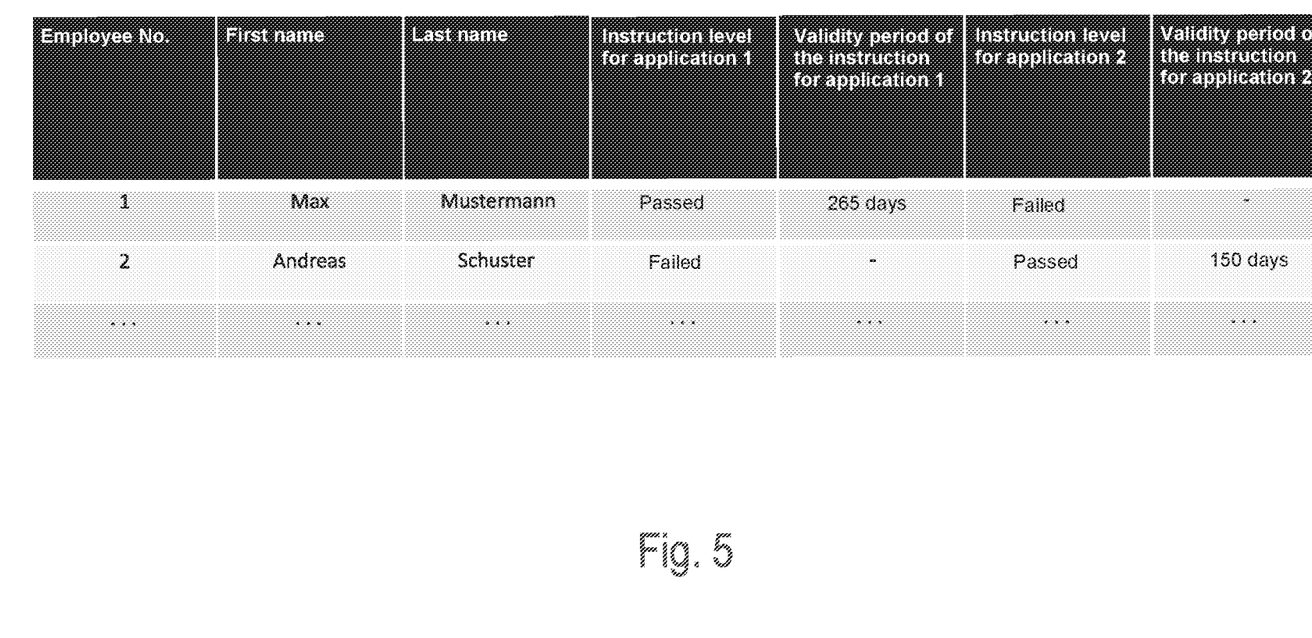
FIG. 5 an example of a user database.

FIG. 5 shows an exemplary representation of a user database that stores information on a user A of an application. The user database comprises information on an employee number, a first name, a last name, an instruction level with respect to a first application, a validity period of the instruction with respect to a first application, an instruction level with respect to a second application, and a validity period of the instruction with respect to a second application. The instruction level of the user A can be determined with a test such as a multiple choice test that has to be performed by the user after an instruction has been performed in order to determine the corresponding instruction level of the user A. If the user A correctly answers more than one predefined number of questions after the instruction for a first application, the value "Passed" or "1" is, for example, entered in the "Instruction level with respect to a first application" column, while the value "Failed" or "0" is entered in all other cases.

Furthermore, the validity period of the instruction indicates how many days a passed instruction is valid for or in how many days a refreshing of an instruction with respect to an application becomes necessary.

Additionally or alternatively, a qualification level with respect to an application can also be defined in the user database. For example, depending on the score reached or depending on the number of correctly answered questions in a test, a qualification level can be determined for a user A and can be entered in the user database. Based on the qualification level, different rights of use and/or access rights to contents of the AR system 1 can, for example, be defined for a user A. Such user databases with qualification levels can be stored in a central database of the respective company.

Figure 6:
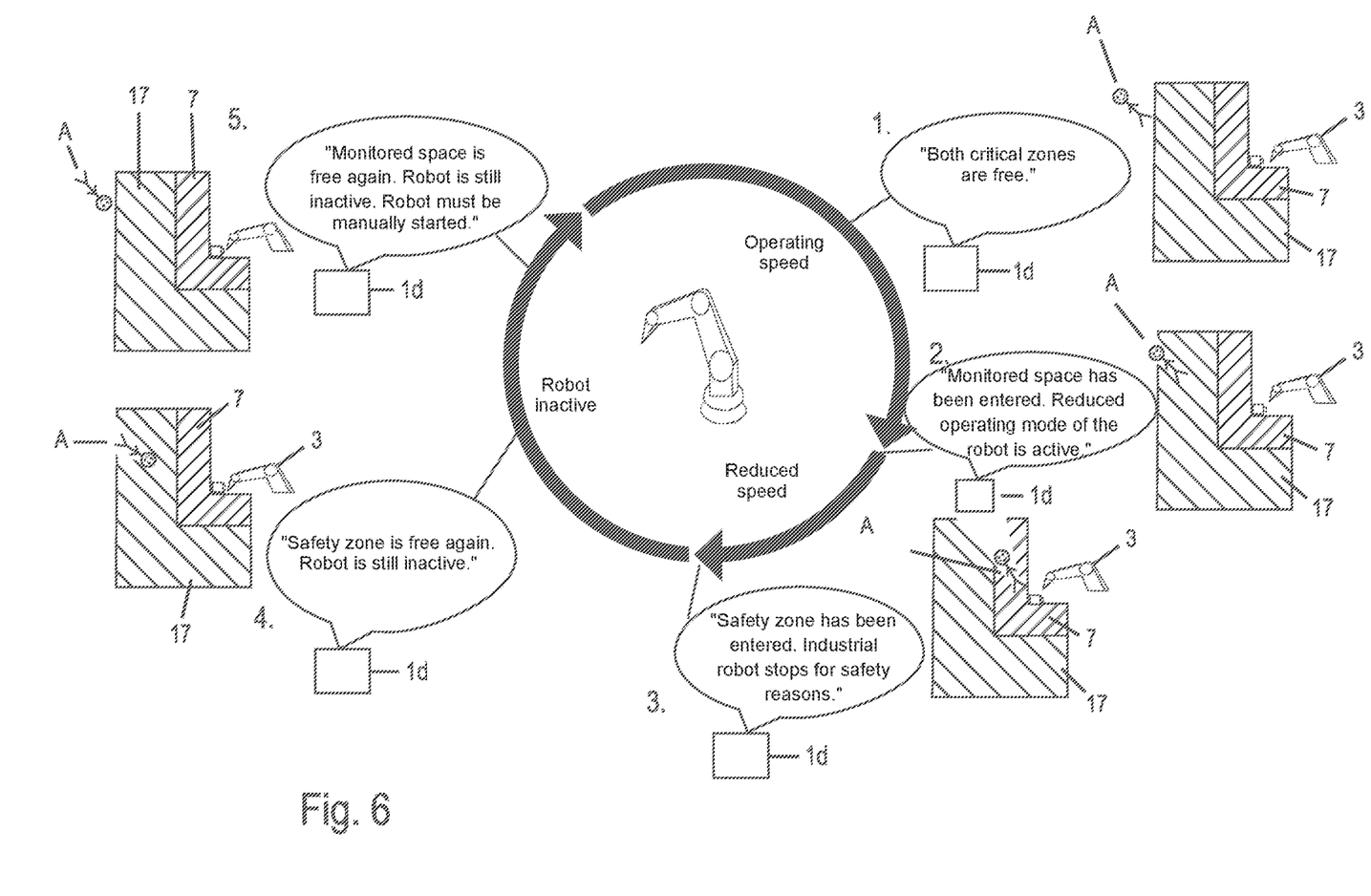
FIG. 6 a phase sequence diagram of a work unit and an associated audio playback by the AR system.

FIG. 6 shows different movement phases of the work unit 3 and an associated audio playback by the AR system 1 when a user A approaches the work unit 3. In FIG. 6, the AR system 1 acts as a warning system. For a better overview, only the audio output unit 1*d* of the AR system 1 was shown in FIG. 6.

In a first phase, the user A with the AR system 1 is located outside the monitored zone 17 and the safety zone 7. The monitoring unit 15, not shown, detects the monitored zone 17 and the safety zone 7 and transmits safety data to the AR system 1. The control unit of the AR system 1 processes the safety data and determines that the user A is located outside the monitored zone 17 or that the user A is not located in the monitored zone 17. As a result, the audio output unit 1*d* outputs an audio signal that conveys that both critical zones are free. Alternatively, the audio output unit 1*d* also cannot output an audio signal. In a second phase, the AR system 1 determines that the user A has entered the monitored zone 17 but not the safety zone 7. As a result, a second audio signal is output that conveys that the monitored zone has been entered and that a reduced operating mode of the work unit 3 is active.

In a third phase, the AR system 1 determines that the user A is also entering the safety zone 7 and, as a result, outputs an audio signal via the audio output unit 1*d* that conveys that the safety zone has been entered and that the work unit 3 stops for safety reasons.

In a fourth phase, the user A leaves the safety zone 7 and continues to be in the monitored zone 17. As a result, the audio output unit 1*d* outputs an audio signal that conveys that the safety zone 7 has been left and that the work unit 3 is still inactive.

In a fifth phase, the AR system 1 determines that the user A has left both the safety zone 7 and the monitored zone 17 and, as a result, outputs an audio signal via the audio output unit 1*d* that conveys that the monitored zone has been left and that the work unit 3 is still inactive and has to be started manually.

REFERENCE NUMERAL LIST

1 augmented reality system
1*a* detection unit
1*b* communication unit
1*c* display unit
1*d* audio output unit
3 work unit
3*a* controller
5 digital end device
7 safety zone
9 virtual representation of the work unit
11 virtual arrow
13 text field
15 monitoring unit
17 monitored zone
19 remote connection

What is claimed is:

1. An augmented reality (AR) system for teaching a user of an application, comprising:
   a detection unit that detects a real environment and provides it as environmental data, wherein at least one work unit is arranged in the real environment, and wherein the at least one work unit comprises a robot;

a communication unit that receives process data from the at least one work unit;

a control unit that processes the process data and the environmental data, wherein a virtual image corresponding to an identified process step can be created based on the process data;

a display unit that displays the real environment and the virtual image in relation to one another to a user; and an audio output unit that, on the basis of the process data, outputs audio signals for instructing a user of the application relative to increasing safety and/or productivity in human-machine interactions, wherein the audio signals are matched to the virtual image, and wherein the process data comprise data for identifying a process step of the at least one work unit and the audio output unit outputs an audio signal corresponding to an identified process step and/or the display unit displays a virtual image corresponding to an identified process step.

2. The AR system in accordance with claim 1,
wherein the AR system comprises a memory in which a plurality of audio signal data and/or augmentation data are stored, wherein the audio signal data and augmentation data can be associated with the process steps and/or phases of a working life cycle.

3. The AR system in accordance with claim 2,
wherein the audio output unit is configured to play back the audio data and/or the display unit is configured to play back the augmentation data before a process step that will occur in the future and/or at the start of a process step.

4. The AR system in accordance with claim 2,
wherein the phases of a working life cycle comprise: putting into operation, normal operation, maintenance, conversion and/or dismantling of the application.

5. The AR system in accordance with claim 1,
wherein the AR system and the work unit are configured to communicate bidirectionally, wherein the AR system is configured to control and/or to influence the work unit.

6. The AR system in accordance with claim 1,
wherein the display unit is additionally configured to display text messages.

7. The AR system in accordance claim 1,
wherein the AR system is configured to check an instruction level of the user by means of a test, and to enter and/or to update the instruction level of the user in a user database based on a test result.

8. The AR system in accordance with claim 7,
wherein the AR system comprises an instruction level determination unit that is configured to determine an identity of the user based on personal identification data and to determine the instruction level of the user based on the determined identity by means of the user database.

9. The AR system in accordance with claim 7,
wherein the work unit is configured to set an operating mode of the work unit based on the instruction level of the user.

10. The AR system in accordance with claim 7,
wherein the AR system is configured to restrict or to extend a range of use and/or contents of the AR system based on the instruction level of the user.

11. The AR system in accordance with claim 1,
wherein the real environment and/or the work unit comprises/comprise a marking that is used by the AR system as a reference point and/or for recognizing the work unit.

12. The AR system in accordance with claim 1,
wherein a monitoring unit is configured to monitor a monitored zone and to transmit safety data to the communication unit, wherein the safety data are processed by the control unit, and the audio output unit is configured to output an audio signal when the processing of the safety data reveals that the user is entering the monitored zone of the monitoring unit.

13. A method of teaching a user of an application by means of an augmented reality system, said method comprising:

detecting a real environment and providing environmental data based on the detected real environment, wherein at least one work unit is arranged in the real environment, and wherein the at least one work unit comprises a robot;

receiving process data from the at least one work unit;

processing the process data and the environmental data, wherein a virtual image corresponding to an identified process step is created based on the process data;

displaying the real environment and the virtual image in relation to one another to a user; and outputting audio signals for instructing the user of the application relative to increasing safety and/or productivity in human-machine interactions on the basis of the process data, wherein the audio signals are matched to the virtual image, and wherein the process data comprise data for identifying a process step of the at least one work unit and the audio output unit outputs an audio signal corresponding to an identified process step and/or the display unit displays a virtual image corresponding to an identified process step.

14. A digital end device for an augmented reality system for teaching a user of an application, said digital end device comprising:

a communication unit that receives process data from at least one work unit and environmental data from at least one detection unit that detects a real environment, wherein the at least one work unit is arranged in the real environment, and wherein the at least one work unit comprises a robot;

a control unit that processes the process data and environmental data, wherein a virtual image corresponding to an identified process step can be created based on the process data;

a display unit that displays the real environment and the virtual image in relation to one another to a user; and an audio output unit that, on the basis of the process data, outputs audio signals for instructing a user of the application relative to increasing safety and/or productivity in human-machine interactions, wherein the audio signals are matched to the virtual image, and wherein the process data comprise data for identifying a process step of the at least one work unit and the audio output unit outputs an audio signal corresponding to an identified process step and/or the display unit displays a virtual image corresponding to an identified process step.

15. The AR system in accordance with claim 7, wherein the AR system is configured to check an instruction level of the user by means of a multiple choice test and to enter and/or to update the instruction level of the user in a user database based on a test result.

\* \* \* \* \*

UNITED STATES PATENT AND TRADEMARK OFFICE
CERTIFICATE OF CORRECTION

| | | |
|---|---|---|
| PATENT NO. | : 12,315,384 B2 | Page 1 of 1 |
| APPLICATION NO. | : 18/096673 | |
| DATED | : May 27, 2025 | |
| INVENTOR(S) | : Christoph Hofmann, Jens Gebauer and Heiko Steinkemper | |

It is certified that error appears in the above-identified patent and that said Letters Patent is hereby corrected as shown below:

On the Title Page

Item (54) and in the Specification Column 1, Lines 1-2, please remove the title "AUGMENTED-REALITY-SYSTEM FOR TEACHING A USER OF AN APPLICATION" and replace with "AUGMENTED REALITY SYSTEM FOR TEACHING A USER OF AN APPLICATION".

Signed and Sealed this
Fifteenth Day of July, 2025

Coke Morgan Stewart
*Acting Director of the United States Patent and Trademark Office*